(12) United States Patent
Neet et al.

(10) Patent No.: US 6,922,001 B2
(45) Date of Patent: Jul. 26, 2005

(54) PROCESS FOR ASSEMBLING AN ALTERNATOR STATOR WITH CLIPS THAT ALLOWS RADIAL INSERTION OF SQUARE WIRE WITH SMALL SLOT OPENINGS

(75) Inventors: Kirk E. Neet, Saline, MI (US); Hanyang B. Chen, Ypsilanti, MI (US); Steven S. Yockey, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/725,880

(22) Filed: Dec. 2, 2003

(65) Prior Publication Data

US 2005/0116574 A1 Jun. 2, 2005

(51) Int. Cl.$^7$ ................................................. H02K 3/34
(52) U.S. Cl. ...................................... 310/215; 310/214
(58) Field of Search ................................. 310/215, 214

(56) References Cited

U.S. PATENT DOCUMENTS

| | | | |
|---|---|---|---|
| 4,407,876 A | 10/1983 | Otty | 428/102 |
| 5,936,326 A | 8/1999 | Umeda et al. | 310/179 |
| 5,986,375 A | 11/1999 | Umeda et al. | 310/215 |
| 5,998,903 A | 12/1999 | Umeda et al. | 370/52 |
| 6,051,906 A | 4/2000 | Umeda et al. | 310/179 |
| 6,124,660 A * | 9/2000 | Umeda et al. | 310/215 |
| 6,242,836 B1 | 6/2001 | Ishida et al. | 310/180 |
| 6,313,559 B1 | 11/2001 | Kusase et al. | 310/179 |
| 6,417,592 B2 | 7/2002 | Nakamura et al. | 310/254 |
| 6,476,530 B1 | 11/2002 | Nakamura et al. | 310/184 |
| 6,507,133 B1 | 1/2003 | Nakamura | 310/201 |
| 6,580,193 B2 * | 6/2003 | Yoshikawa et al. | 310/215 |
| 2002/0014806 A1 | 2/2002 | Senno et al. | 310/215 |
| 2002/0153799 A1 | 10/2002 | Kurahashi et al. | 310/201 |
| 2003/0033709 A1 | 2/2003 | Bradfield | 29/596 |

* cited by examiner

Primary Examiner—Dang Le
(74) Attorney, Agent, or Firm—Brinks Hofer Gilson & Lione

(57) ABSTRACT

A stator assembly for an alternator in accordance with the present invention includes a generally cylindrically-shaped stator core having a plurality of core slots formed along the inner surface thereof and defined by a radial depth and wherein a stator coil is disposed. The core slots thereby define a plurality of teeth therebetween, which are connected to the stator core by a yoke portion. The core slots are shaped and extend between a first and a second end of the stator core. A plurality of clips closely fit into one of said core slots for lining each respective core slot. The clips have a pair of extending leg members connected to a back end and forming an aperture therebetween. The clips are formed from a magnetically permeable material. A stator winding includes substantially straight wire segments that are received by the clips formed of substantially straight wire segments. The substantially straight wire segments of the stator winding and the clips are electrically insulated from one another. At least one of the extending leg members is bent towards the other leg member over a portion of the at least one row of substantially straight wire segments in the clips, narrowing the aperture between the extending leg members. Each of the plurality of clips and said substantially straight wire segments are each inserted into one of the plurality of core slots. Slits are added in these clips to reduce eddy current loss.

14 Claims, 4 Drawing Sheets

PROCESS FOR ASSEMBLING AN ALTERNATOR STATOR WITH CLIPS THAT ALLOWS RADIAL INSERTION OF SQUARE WIRE WITH SMALL SLOT OPENINGS

BACKGROUND

The present invention relates generally to stators for vehicle dynamo-electric machines and, in particular, to a stator assembly for a dynamoelectric machine with clips that accept radial insertion of square wire.

Dynamoelectric machines, such as electric motors, or alternators are well-known. Alternators typically are composed of a stator assembly fixedly supported by an alternator housing and a rotor assembly supported coaxially within the stator assembly. The stator assembly includes a generally cylindrically-shaped stator core having a plurality of core slots formed along the inner surface thereof and a stator coil disposed in the core slots. The core slots define a plurality of teeth therebetween. The teeth are connected to the core by a yoke portion.

The stator coil is formed by connecting a plurality of wires wound thereon, forming stator windings. The stator windings are accommodated at the plurality of core slots in a plurality of radially extending layers, and are formed of straight portions that are located in the core slots and of end loop sections that connect two adjacent straight portions and are formed in a predetermined multi-phase (e.g. three or six) winding pattern in the slots of the stator core.

It is known in the art that in order to increase the output and efficiency of an alternator it is desirable to have stator winding conductors of rectangular-shaped cross sections that are aligned in a radial row in each core slot and whose widths, including any insulation, closely fit to the width of the core slots. This is advantageous because the larger conductor width reduces the electrical resistance of the stator winding, and therefore reduces the stator conductor power losses. It is also known in the art to provide a stator core with small slot openings at the inner diameter of the core, which reduces the effective air gap are to increase the alternator output. A smaller slot opening also reduces the fluctuation of magnetic flux on the rotor pole surface which reduces eddy current losses on the rotor pole and therefore increases alternator efficiencies. It is also desirable to ease manufacturing of the stator assembly by having continuous rectangular shaped conductors to eliminate any weld operation required to connect individual U-shaped conductors axially inserted in the core slot openings. However, these desirable features lead to a design contradiction in that the conductors must be large to lower the electrical resistance, must also fit closely to the width of the core slots, and must be continuous conductors, but cannot be inserted into the core slots from a radially inward position through a smaller core opening.

Prior art remedies typically attempted to resolve this design contradiction by utilizing continuous conductors that are small enough to enter the slot openings but do not closely fit the width of the slot. These prior art remedies result in large voids and low slot fill factors, which leads to an alternator with low output and efficiency. Other prior art remedies utilize U-shaped conductors, which are axially inserted into the core slots and then welded together to form the finished stator windings. These other prior art remedies manage to accomplish a high slot fill factor and consequently low resistance, but encounter difficulties in the assembly of multiple insertions and welds.

In view of the above discussed problems, it is advantageous to provide a stator having core slots that allow for conductors that fit closely to the width of the core slots and that allow the conductors to be inserted into the core slots from a radially inward position while also providing a smaller core opening. As a result, an alternator having high output and high efficiency while also being easy to assemble and manufacture is realized.

BRIEF SUMMARY

The present invention is defined by the following claims. This description summarizes some aspects of the present embodiments and should not be used to limit the claims.

A stator assembly for an alternator in accordance with the present invention includes a generally cylindrically-shaped stator core having a plurality of core slots formed along the inner surface thereof and defined by a radial depth and wherein a stator coil is disposed. The core slots thereby define a plurality of teeth therebetween, which are connected to the stator core by a yoke portion. The core slots may be rectangular shaped and extend between a first and a second end of the stator core. A plurality of clips is each shaped to closely fit into one of said core slots for lining each respective core slot. The clips have a pair of leg members extending from a back end and at least one of the extending leg members is bent towards the other leg member over a portion of the substantially straight wire segments in the clips, narrowing the aperture between the extending leg members. The clips are formed from a magnetically permeable material. A stator winding includes substantially straight wire segments that are received by the clips, which may be formed in at least one row of substantially straight wire segments. The substantially straight wire segments of the stator winding and the clips are electrically insulated from one another. Each of the plurality of clips and said substantially straight wire segments are each inserted into one of the plurality of core slots.

A method for manufacturing the stator winding according to the present invention comprises providing the stator core and a plurality of clips; providing substantially straight wire segments for the stator winding; opening the aperture of the clips by temporarily increasing the angle between the sides of the clips; loading the substantially straight wire segments into each one of the plurality of clips; allowing the clips to return to their original shape by decreasing the angle between the sides of the clip, thereby narrowing the aperture between the extending leg members of the one of the plurality of clips; and inserting each one of the plurality of clips loaded with the substantially straight wire segments into one of a plurality of core slots.

Further aspects and advantages of the invention are described below in conjunction with the present embodiments.

BRIEF DESCRIPTION OF THE DRAWINGS

The invention, together with the advantages thereof, may be understood by reference to the following description in conjunction with the accompanying figures, which illustrate some embodiments of the invention.

DETAILED DESCRIPTION OF THE PRESENT INVENTION

Figure 1:
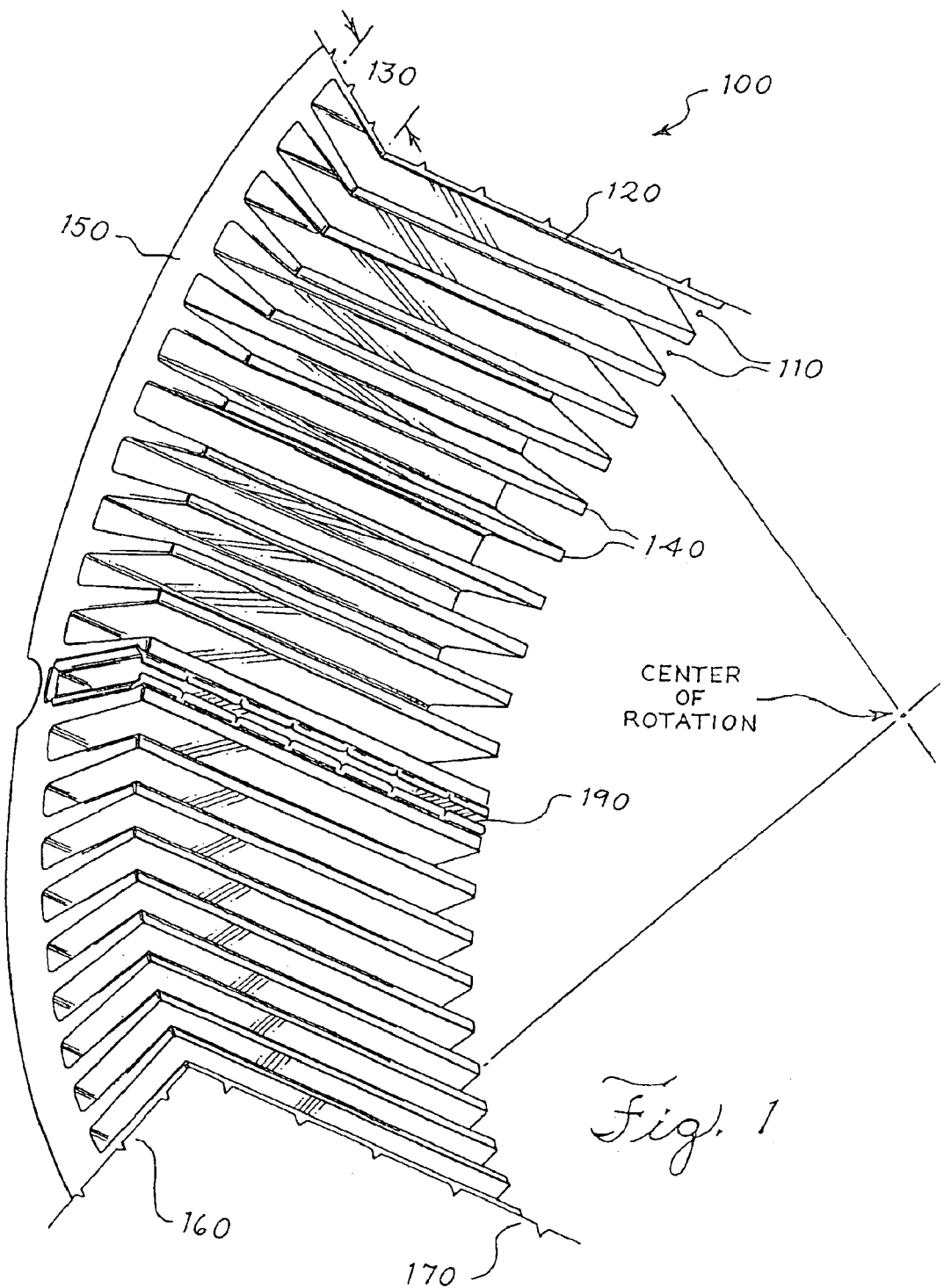
FIG. 1 is a fragmental perspective view of a stator core in accordance with the present invention.

While the present invention may be embodied in various forms, there is shown in the drawings and will hereinafter be described some exemplary and nonlimiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Typically, an alternator includes a stator, a rotor, a frame, a brush unit, a rectifier unit and a rear cover. The stator includes a stator core having a plurality of slots, a stator winding accommodated in the slots and a plurality of insulation members insulating the stator winding.

The frame accommodates the stator and the rotor and supports the rotor so as to rotate on the rotary shaft. The frame may support the stator around the rotor so that the inner periphery of the stator faces the outer periphery of the pole core of the rotor at a suitable gap. In some applications, the frame may also support the rotor around the stator so that the outer periphery of the stator faces the inner periphery of the pole core of the rotor at a suitable gap.

Referring now to FIG. 1, a fragmental perspective view illustrates one embodiment of a stator core 100 suitable for accepting a plurality of clips. The stator core 100 is generally cylindrically-shaped having a plurality of core slots 110 formed along the inner surface 120 thereof and defined by a radial depth 130 along a radial axis of the stator core 100 and wherein a stator winding may be disposed. The core slots 110 are preferably equally spaced along the inner surface 120 of the stator core 100. The core slots 110 thereby define a plurality of teeth 140 therebetween, which are connected to the stator core by a yoke portion 150. The core slots 110 may be rectangular shaped, run along an axial length of the stator core 100, reach both ends 160 and 170 of the stator core 100. Alternatively, the core slots 110 may be may be square shaped or any other shape, which may allow each core slot for a dose fit with a corresponding clip 190. The teeth 140 are connected to the stator core 100 at a yoke portion 150 thereof and radially extend forward to a rotor situated substantially within the axial length of the stator core 100. Alternatively, in the event that the stator core 100 is surrounded axially by a rotor, the core slots 110 are formed in an exterior surface of the stator core 100.

Figure 2:
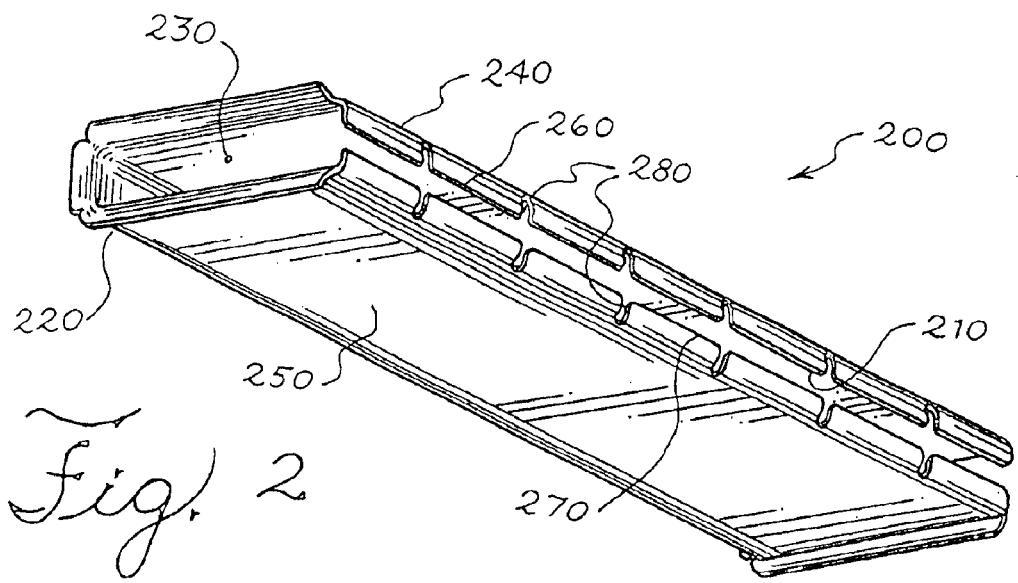
FIG. 2 is a perspective view of a clip in accordance with the present invention.

Referring now to FIG. 2, a perspective view illustrates one embodiment of a clip 200 in accordance with the present invention and suitable for accepting the stator winding. The clip 200 is made from a material having flux carrying properties and may be made of steel, iron alloy, or any other magnetically permeable material. The clip 200 may initially have a flat shape, is then bent to become substantially U shaped with an open front end 210, a closed back end 220, and side ends 230. The open front end 210, which may also be referred to as an aperture, includes a first extending leg member 240 and a second extending leg member 250 extending outwardly from the back end 220 forming the substantially U-shaped clip 200.

A plurality of slits 280 is provided along both extending leg members 240 and 250 at the open front end 210 at corners formed by the meeting points of the open front end 210 and the open side ends 230 and by the back end 220 and the side ends 230. The plurality of slits 280 is made to cut completely through the thickness of the clip 200, which may vary between 0 mm and about 5 mm. These plurality of slits 280 are incorporated to simulate a laminated clip structure wherein the slits prevent eddy currents from flowing axially in the clip, thereby further reducing alternator losses and thereby further increasing alternator efficiency.

The first extending leg member 240 includes a free end 260 and the second leg member 250 includes a free end 270. The outer edges of each of the free ends 260 and 270 are preferably at a substantially equal distance from the back end 220. The free ends 260 and 270 are bent near their respective outer edges, narrowing the aperture 210 between the extending leg members 240 and 250. The clip 200 is adapted to accept an electrical insulation member to form a lining on the inner surface of the clip 200 prior to the insertion of the substantially straight wire segments. The clip 200 is spread open by temporarily increasing the angle between the leg members 240 and 250 to accept the loading of substantially straight wire segments, and is adapted to closely fit around the width of the substantially straight wire segments. The clip 200 may also be spread open by temporarily unbending the free ends 260 and 270.

Preferably at least one of the free ends 260 and 270 is bent near its respective outer edge thereby defining a cap over a portion of the substantially straight wire segments in the clip 200, and narrowing the aperture 210 between the extending leg members 240 and 250.

The clip 200 is adapted to be inserted into and fixedly received in one of the plurality of core slots 110 of the stator core 100, once loaded with the substantially straight wire segments. Once inserted into one of a plurality of core slots 110, the outer edges of the side ends 230 and of the back end 220 of the clip are bent outwardly to facilitate the adhesiveness or varnishing bonding to the sides of the stator teeth 140 and to the yoke 150. The clips slits 280 may be made to be as long as the bent portions of the caps along the front end of the clips 210 or as long as the bent portions along the sides of the clips 230 (not shown).

Figure 3A:
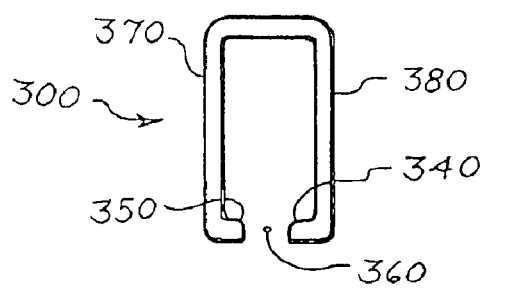
FIGS. 3a, and 3b are cross-sectional views of one embodiment of a clip insert in accordance with the present invention.
Figure 3B:
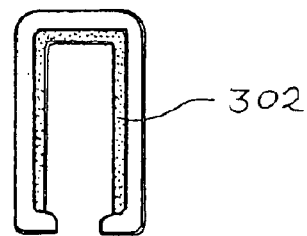

Referring to FIGS. 3a–3b, cross-sectional views illustrate an alternate embodiment of a clip 300, in accordance with the present invention, suitable for accepting stator windings. The embodiment of FIG. 3a represents a clip 300 having a substantially U shape. The clip 300 is illustrated with both free ends 340 and 350 bent near their respective outer edges over a portion of an aperture 360, narrowing the aperture 360 between the extending leg members 370 and 380. Prior to being bent, the outer edges of each of the free ends 340 and 350 are preferably at a substantially equal distance from the back end of the clip 390. Hence, the free end 340 is bent towards the second extension member 380 and the free end 350 is bent towards the first extension member 370 such that the free ends 340 and 350 are substantially parallel to each other and substantially perpendicular to the extension members 360 and 370. Therefore, the free ends 340 and 350, when in the installed position, form a gap 390 therebetween, smaller than the original aperture 360.

Referring to FIG. 3b, an insulation member 302 is also displayed lining the inner surface of the clip 300, specifically along the inner surfaces of the back end and the first and second leg members, to electrically insulate the clip and the substantially straight wire segments from one another. The insulation member 302, which may be a form of paper, paper composite, or any other form of insulation having electrically insulating properties, is glued to the inside of the clip 300 prior to loading the stator winding to the clip 300. The insulation member 302 may include an extension that lines the inner surface of the cap formed by the bent free ends 340 and 350 (not shown).

The clip 300 has edges that are rolled or folded at the top and at the bottom of the clip 300 to present a smooth round edge to the wires. This feature of rolled edges may prevent the wire from electrically shorting out with sharp edges of the clip 300 or core.

Figure 4A:
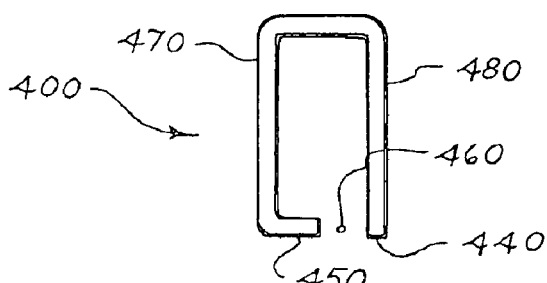
FIGS. 4a and 4b are cross-sectional views of an alternate embodiment of a clip in accordance with the present invention.
Figure 4B:
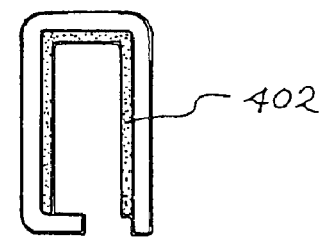

Referring to FIGS. 4a–4b, two cross-sectional views illustrate an alternate embodiment of a clip 400, in accordance with the present invention, suitable for accepting stator windings. The embodiment of FIG. 3a represents a clip 400 having a substantially U shape. The clip 400 is illustrated with one end being straight 440 and the other end 450 being bent near its respective outer edge over a portion of an aperture 460, narrowing the aperture 460 between the extending leg members 470 and 480. Prior to the loading of the clip 400 with stator winding conductors, the length of the first extending leg member 470 is greater than the length of the second extending leg member 480. The outer edges of each of the straight and the bent ends 440 and 450 are preferably at a substantially equal distance from the back end of the clip 490. Hence, the free end 450 is bent towards the second extension member 480 while the free end 440 remains straight. Therefore, the free ends 440 and 450, when in the installed position, form a narrower aperture 410 therebetween the original aperture 460.

Referring to FIG. 4b, an insulation member 402 is also displayed lining the inner surface of the clip 400 to electrically insulate the clip and the substantially straight wire segments from one another. The insulation member 402, which may be a form of paper or other forms of insulation, is glued to the inside of the clip 400 prior to loading the wire to the clip 400. The clip 400 has edges that are rolled at the top and at the bottom of the clip 400 to present smooth round edges to the wires. This feature of rolled edges prevents the stator winding conductors from electrically shorting out with any sharp edges of the clip 400. The insulation member 402 may include an extension that lines the inner surface of the cap formed by the bent free end 450 (not shown).

Figure 5A:
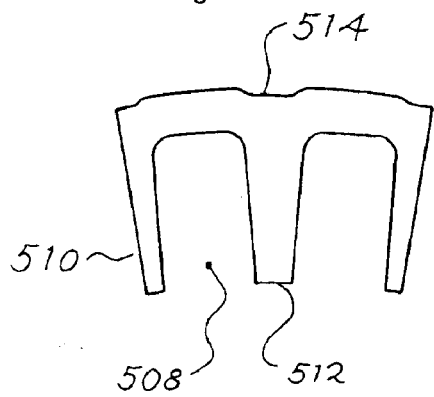
FIGS. 5a–5d is a multi-step assembly embodiment of a method for providing a clip loaded with straight wire segments and an insulating member into the core slots of a stator, in accordance with the present invention.

Referring to FIGS. 5a–5d, a multi-step assembly embodiment of a method 500 for assembling clips 502 with straight wire segments 504 and insulating members 506 into the core slots 508 of a stator 510 is shown, in accordance with the present invention. Referring to FIG. 5a, a plurality of stator slots 508 defining an angular portion of the stator core 510. The core slots 508 thereby define a plurality of teeth 512 therebetween, which are connected to the stator core 510 by a yoke portion 514.

Figure 5B:
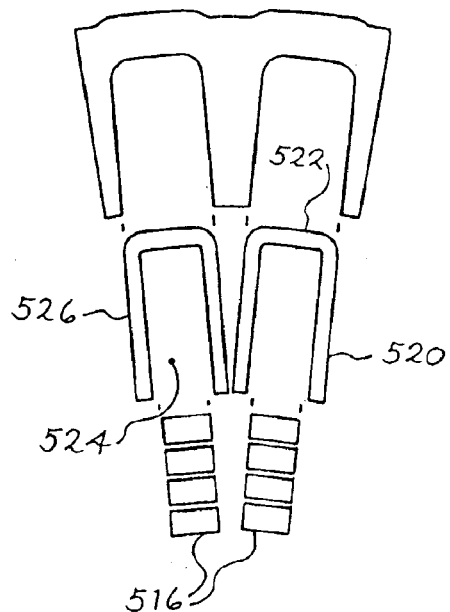
Figure 5C:
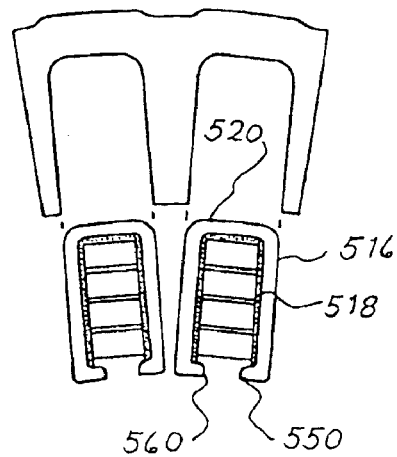

Referring to FIG. 5b, a plurality of straight wire segments 516 is shown as adaptably insertable in a plurality of clips 520. The plurality of straight wire segments 516, typically having a rectangular cross section, may be aligned in rows wherein each row is designated to be inserted into a respective clip 520. For those skilled in the art, it is commonly understood that wires with rectangular cross sections include wires with square cross sections and that radii may exist on the corners of the rectangular cross sections.

Referring to 5c, the plurality of clips 520 are shown filled with a respective plurality of straight wire segments 516 and with a corresponding plurality of insulation members 518 therebetween. The plurality of straight wire segments 516 may be aligned in layered rows in each respective clip 520 and fitted closely to the width of the respective clip 520. The plurality of insulation members 518 are adapted to be fixedly glued in the respective clips 520, using a kind of adhesive or the like joining an outer surface of insulation members 518 and the inner surface of the clips 520. A stator winding pattern may consist of a plurality n of phases, where the straight portions of each phase are located in every nth stator core slot where they may be aligned in layered rows.

Once loaded the clips 520, with a predetermined number of substantially straight segments, the free end 550 is bent towards the first extension members and the free end 560 is bent towards the second extension members such that the free ends 550 and 560 are substantially parallel to each other and substantially perpendicular to the extension members 530 and 540. The free ends 340 and 350, when in the installed position, form an opening 590 therebetween, smaller than the original aperture 580. The bending of the free ends 550 and 560 surround partially the straight wire segments 516, and holds in place the straight wire segments. Preferably, the bending of the free ends 550 and 560 can be eliminated by utilizing clips with localized material memory that naturally spring back closed after being loaded with the straight wire segments 516. Alternatively, the loaded clips 520 may be inserted in the stator core slots with open clips 520, and the sides of the core slots are adapted to close the clips 520, automatically.

Figure 5D:
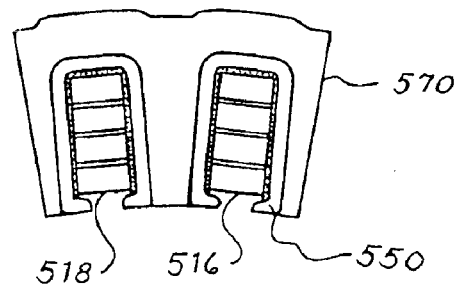

Referring to FIG. 5d, the plurality of assembled clips 520 are shown inserted in the corresponding plurality of core slots 508. To prevent the clip and stator winding assembly from falling back trough the inner surface 120 of the stator core 100 and into the inner diameter of the stator, the clips 520 may be press fit into the stator core 514. Alternatively, the clips 520 and the stator winding may be varnished to bond them to the stator core. Typically, the stator winding conductors are varnished to insulate the n different phases of the stator winding. The varnishing bonds the wires together and provides additional insulation along with the insulation members once the clips 520 are inserted in the core slots. Alternatively, the insulation members may be a coating, which is electrostatically applied or painted to the inner surface of the clips 520.

Once in the installed position the clips 520 fill in the radial depth 130 of the corresponding core slots 505 along the radial axis of the stator core 510, without extending axially beyond the inner surface of the stator core 120. The outer edges of the bent free ends 550 and 560 of the clips 520 are at about the same radial position as the outer edges of the stator core teeth 512 defined therebetween the stator slots 508. The inner surface of the stator core 120, defined by the outer edges of the clips 520 and by the stator core teeth 512, presents a substantially increased surface area, which reduces the effective air gap between the stator core 510 and the rotor, and in turn reduces the fluctuation of magnetic flux on the rotor pole surface which reduces eddy current losses and therefore increases alternator efficiencies.

The magnetic flux carrying properties of the clips 200 provides for an increased magnetic flux carrying area on the inner surface 120 of the stator core as well as the volume of the magnetic flux flowing from the stator yoke 150 to the rotor poles. A magnetic flux is generated by the rotor coil (not shown) and travels in a circular path from a hub encircled by a rotor coil, to a pole, across the air gap, radially into a stator tooth and in this case into the caps (bent ends) of the clips, circumferentially around the stator yoke, radially back into another tooth, again across the air gap, into an opposite polarity rotor pole, and back into the hub to complete a circular path (not shown). As the rotor rotates respectively to the stationary stator, the alternating polarity pole fingers pass by each local point of each clip cap. Therefore, each local point sees a fluctuating +/− magnetic flux.

For an alternator that includes these clips caps, the magnetic flux travels some what normal to the clips caps as it crosses the air gap between the rotor poles and the stator inner surface, and fluctuates due to the rotation of the poles. Hence, the flux induces eddy currents and therefore losses on the clip caps. It is known that to reduce the amount of eddy current losses, the clip may be laminated normal to the surface of the eddy current losses. The clips, however, are hard to laminate because of their cross sectional thickness. The solution to reducing eddy currents is to locally add laminations to the clips caps by inducing cuts or slices in the caps to break up the eddy currents. In the present invention, eddy current breakers are cut or sliced into the clips along the cap area. They may also be sliced along the cap area and along the two sides of the clips or a portion of the two sides of the clips (not shown). The cutting/slicing along the sides may be necessary as a portion of the flux passing along a tooth may jump across the core slots into the next tooth, instead of completing the full path from one tooth to the yoke and back down another tooth. Further, the magnetic flux is not only fluctuating as the rotor rotates but also normal to the sides of the clips, and therefore may generate eddy current losses on the sides of the clips.

The straight wire segments, having a substantially rectangular shaped cross section and with widths that closely fit the width of the clips provide a desirable reduction in the electrical resistance, which reduces stator winding power losses. The clips having reduced aperture, at the inner surface of the stator core, over the rows of straight wire segments lead to a desirable reduction in the effective air gap, which increases the alternator output. In addition, the use of clips and straight wire conductors leads to a desirable ease and reduced time of manufacturing of the stator assembly.

Figure 6:
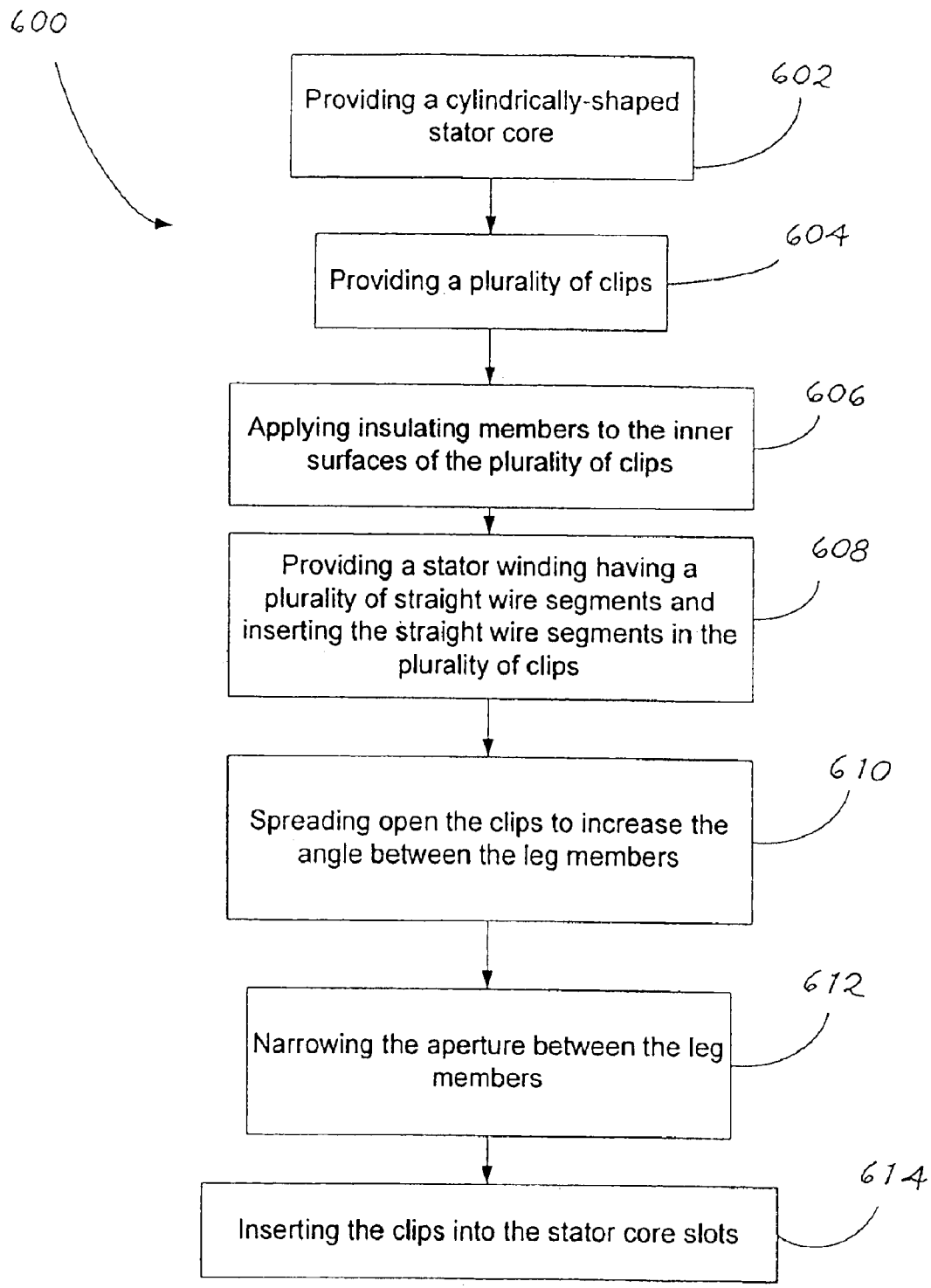
FIG. 6 is a flow chart illustrating an embodiment of a method for making a stator assembly having a clip loaded with straight segments and an insulating member into the core slots of the stator.

Referring to FIG. 6, a flow chart 600 illustrates an embodiment of a method for assembling a stator assembly having a clip 520 loaded with substantially straight segments 516 and an insulating member 518 into the core slots 508 of the stator 510. At step 602, a generally cylindrically-shaped stator core 510, having a plurality of circumferentially spaced axially extending core slots 508, is provided. The core slots 508 having a respective radial depth 130 form a plurality of tooth members 512 therebetween, and extend between a first end 160 and a second end of the stator core 170.

At step 604, a plurality of clips 520, each shaped to closely fit into the core slots 508 is provided. Each of the plurality of clips 520 have a pair of leg members 526 extending from a back end 522 and defining an aperture 524 between them. At step 606, an insulating member 518 is applied to the inner surface of each of said plurality of clips 520. At step 608, the plurality of clips 520 are spread open by temporarily increasing the angle between the leg members 526. A stator winding having a plurality of substantially straight segments 516 is provided at step 610, such that the substantially straight segments 516 are inserted in each of the plurality of clips 520 via their respective apertures 524. At step 612, the plurality of clips is returned their original shape thereby narrowing the aperture 524 between the extending leg members 526. Then, the loaded clips 520 are inserted into each of the core slots 508, at step 614.

Specific embodiments of a process for assembling an alternator stator with clips that allow radial insertion of square wire via small slot openings, according to the present invention, have been described for the purpose of illustrating the manner in which the invention is used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A stator assembly for an dynamoelectric machine, comprising:

a generally cylindrically-shaped stator core having a plurality of circumferentially spaced axially-extending core slots in a surface thereof and each having a respective radial depth and a plurality of tooth members therebetween, said core slots extending between a first and a second end of said stator core;

a plurality of clips, each shaped to closely fit into one of said core slots for lining each respective core slot and having a pair of leg members extending from a back end and forming an aperture therebetween, said clips being formed from a magnetically permeable material; and a stator winding having substantially straight wire segments received by said clips and said substantially straight wire segments of said stator winding and said clips being electrically insulated from one another;

wherein at least one of said extending leg members is bent over a portion of said substantially straight wire segments in said clips, narrowing said aperture between said extending leg members;

wherein a plurality of slits are made along the front ends of the clips.

2. The stator assembly according to claim 1 wherein said clips are generally U-shaped.

3. The stator assembly according to claim 1 wherein said clips are made from a magnetic permeable material.

4. The stator assembly according to claim 1 wherein said aperture is narrowed to a width smaller than the width of said straight wire segments.

5. The stator assembly according to claim 1 wherein said straight wire segments of said stator winding and said clips are electrically insulated from one another by insulating members lining the inner surfaces of said clips.

6. The stator assembly according to claim 5 wherein said insulating members are made from a paper, a paper composite, or another form of insulation having electrically insulating properties.

7. The stator assembly according to claim 5 wherein the insulation member is a coating which is applied to the inner surface of the clips.

8. The stator assembly according to claim 1 wherein said substantially straight segments have a substantially rectangular cross section.

9. The stator assembly according to claim 1 wherein said stator winding and clip assemblies are each press fit respectively into the stator core slots.

10. The stator assembly according to claim 1 wherein the clips and the stator winding are varnished to fixedly bond them or adhesively bonded to the stator core slots.

11. The stator assembly according to claim 1 wherein a stator winding pattern consists of n phase conductors, and each conductor includes straight wire segments aligned in at least one row in each slot.

12. The stator assembly according to claim 1 wherein said clips are retained in said core slots by adhesively bonding together said clips and said core slots.

13. The stator assembly according to claim 1 wherein said plurality of slits are made along the front ends and at least a portion of sides of the clips.

14. A stator assembly for an dynamoelectric machine, comprising:

a generally cylindrically-shaped stator core surrounded axially by a rotor, having a plurality of circumferentially spaced axially-extending core slots in a exterior surface thereof and each having a respective radial depth and a plurality of tooth members therebetween, said core slots extending between a first and a second end of said stator core;

a plurality of clips, each shaped to closely fit into one of said core slots for lining each respective core slot and having a pair of leg members extending from a back end and forming an aperture therebetween, said clips being formed from a magnetically permeable material; and a stator winding having substantially straight wire segments received by said clips and formed in at least one row of said substantially straight wire segments, said substantially straight wire segments of said stator winding and said clips being electrically insulated from one another;

wherein at least one of said extending leg members is bent over a portion of said substantially straight wire segments in said clips, narrowing said aperture between said extending leg members, and clips and substantially straight wire segments assemblies are each inserted into one of the plurality of core slots;

wherein a plurality of slits is made along the front ends of the clips.

* * * * *